US010565679B2

(12) United States Patent
Kawaguchi et al.

(10) Patent No.: US 10,565,679 B2
(45) Date of Patent: Feb. 18, 2020

(54) IMAGING DEVICE AND METHOD

(71) Applicants: Keiichi Kawaguchi, Kanagawa (JP); Tomonori Aikawa, Kanagawa (JP)

(72) Inventors: Keiichi Kawaguchi, Kanagawa (JP); Tomonori Aikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/668,045

(22) Filed: Aug. 3, 2017

(65) Prior Publication Data

US 2018/0061000 A1    Mar. 1, 2018

(30) Foreign Application Priority Data

Aug. 30, 2016  (JP) .................. 2016-168088

(51) Int. Cl.
*H04N 7/18* (2006.01)
*G06T 3/00* (2006.01)
*G06T 5/00* (2006.01)
*G06T 5/50* (2006.01)
*H04N 5/232* (2006.01)

(52) U.S. Cl.
CPC ............ *G06T 3/0018* (2013.01); *G06T 5/006* (2013.01); *G06T 5/50* (2013.01); *H04N 5/23238* (2013.01); *H04N 5/23245* (2013.01)

(58) Field of Classification Search
CPC ................................................... G06T 3/0018
USPC .......................................................... 348/36
See application file for complete search history.

(56) References Cited

U.S. PATENT DOCUMENTS

| 2005/0062869 A1* | 3/2005 | Zimmermann | G02B 13/06 348/335 |
| 2005/0271299 A1* | 12/2005 | Ajito | G06T 3/005 382/293 |
| 2009/0074242 A1* | 3/2009 | Yamamoto | H04N 21/23892 382/100 |
| 2009/0161946 A1* | 6/2009 | Sato | G06T 7/97 382/154 |
| 2011/0010776 A1* | 1/2011 | Ceraolo | G06Q 10/087 726/28 |
| 2011/0141321 A1* | 6/2011 | Tang | G06T 5/006 348/240.99 |
| 2016/0050369 A1 | 2/2016 | Takenaka et al. | |

(Continued)

FOREIGN PATENT DOCUMENTS

| JP | 2016-149734 | 8/2016 |
| JP | 2016-149736 | 8/2016 |

*Primary Examiner* — Leron Beck
(74) *Attorney, Agent, or Firm* — Oblon, McClelland, Maier & Neustadt, L.L.P.

(57) ABSTRACT

An imaging device incorporated in an omnidirectional video capturing system including an imager, a memory, and a transmitter. The imager includes imaging lenses to capture images from a plurality of directions. The memory stores projective transformation data. The projective transformation data includes photographing direction data representing the plurality of directions and projection data representing image heights of the images associated with angles at which light rays enter the imaging lens. The transmitter reads the projective transformation data stored in the memory, and transmits frame data of the images and the projective transformation information to an image processing device of the omnidirectional video capturing system.

13 Claims, 13 Drawing Sheets

(56) References Cited

U.S. PATENT DOCUMENTS

2016/0212336 A1 7/2016 Takenaka et al.
2016/0234438 A1 8/2016 Satoh

\* cited by examiner

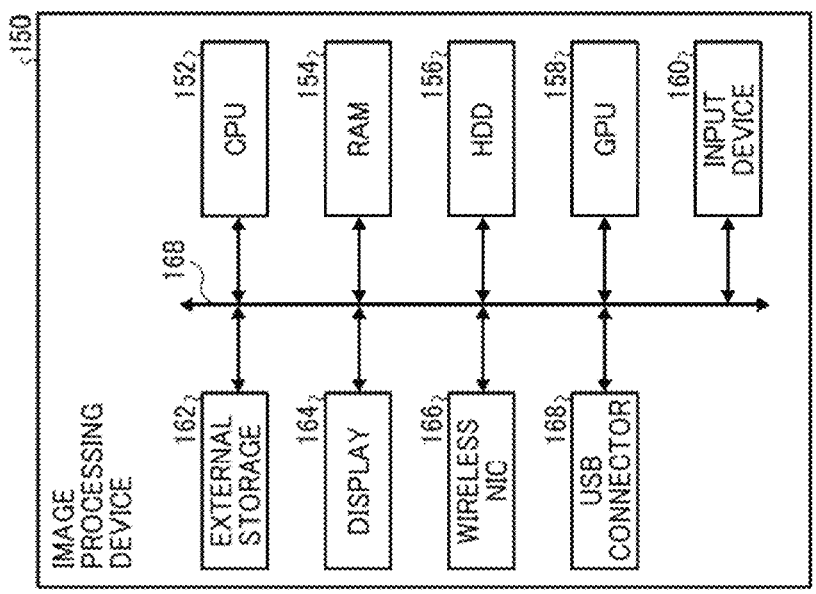
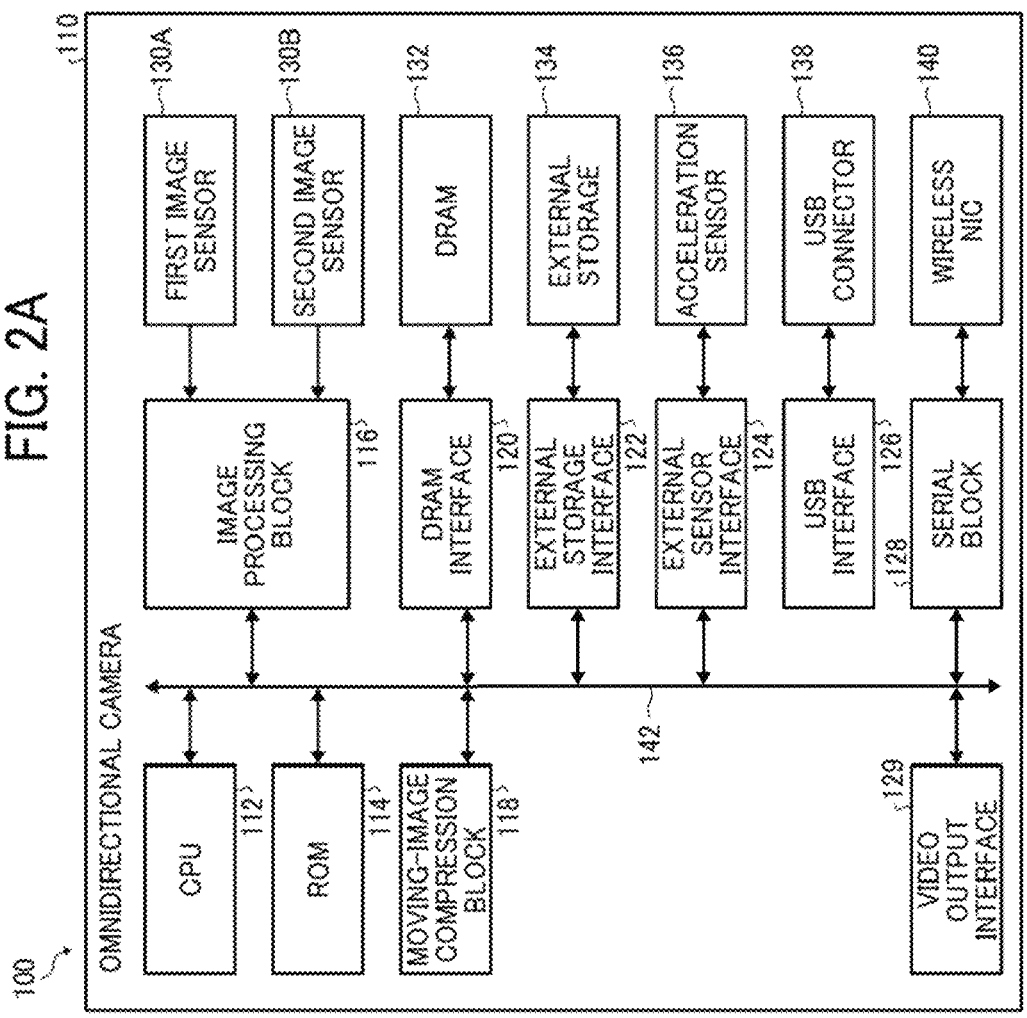

FIG. 4C

| IMAGE SENSOR 130A | | IMAGE SENSOR 130B | |
|---|---|---|---|
| CENTRAL COORDINATE (480,480) | | CENTRAL COORDINATE (1440,480) | |
| INCIDENT ANGLE φ (deg) | IMAGE HEIGHT h (pix) | INCIDENT ANGLE φ (deg) | IMAGE HEIGHT h (pix) |
| 0 | 0 | 0 | 0 |
| 5 | 24 | 5 | 24 |
| 10 | 48 | 10 | 48 |
| | | | |
| 85 | 408 | 85 | 408 |
| 90 | 432 | 90 | 432 |
| 95 | 456 | 95 | 456 |
| 100 | 480 | 100 | 480 |

FIG. 8A

| RTP HEADER | IMAGE FRAME HEADER | FRAME DATA |

OPTIONAL AREA FOR IMAGE FRAME HEADER ← PROJECTIVE TRANSFORMATION DATA

FIG. 8B

| RTP HEADER | IMAGE FRAME HEADER | FRAME DATA Fa | PROJECTIVE TRANSFORMATION DATA Pa | FRAME DATA Fb | PROJECTIVE TRANSFORMATION DATA Pb | ... |

FIG. 8C

| RTP HEADER | IMAGE FRAME HEADER | FRAME DATA |

PROJECTIVE TRANSFORMATION DATA

IMAGING DEVICE AND METHOD

CROSS-REFERENCE TO RELATED APPLICATION

This patent application is based on and claims priority pursuant to 35 U.S.C. § 119(a) to Japanese Patent Application No. 2016-168088, filed on Aug. 30, 2016 in the Japan Patent Office, the entire disclosure of which is hereby incorporated by reference herein.

BACKGROUND

Technical Field

Embodiments of the present disclosure relate to an imaging device and an imaging method.

Background Art

An omnidirectional video acquisition system is known that outputs an omnidirectional image generated by combining wide-angle images captured using a plurality of fish-eye lenses with one shot.

In a projective transformation from a plurality of wide-angle images into an. omnidirectional image, any overloaded process, such as pattern matching, is performed. To reduce a processing load on imaging devices, a technology that switches between modes according to the intended use of omnidirectional images is known in the art. The imaging devices using such a technology to switch processes for joining images according to a selected mode can reduce the processing load on imaging devices. With such a technology, however, the imaging devices fail to deal with images including a great amount of information in real time, and become overloaded with the projective transformation process.

To handle such circumstances, there is a demand for a technology that distributes data for transforming image data into an omnidirectional image, thus to perform a projective transformation process in real time, at one terminal side that receives images.

SUMMARY

In one aspect of this disclosure, there is provided an improved imaging device incorporated in an omnidirectional video capturing system including an image processing device. The imaging device includes an imager, a memory, and a transmitter. The imager includes imaging lenses to capture images from a plurality of directions. The memory stores projective transformation data. The projective transformation data includes photographing direction data representing the plurality of directions and projection data representing image heights of the images associated with angles at which light rays enter the imaging lens. The transmitter reads the projective transformation data stored in the memory, and transmits frame data of the images and the projective transformation information to an image processing device of the omnidirectional video capturing system.

In another aspect of this disclosure, there is provided an improved method of an omnidirectional video capturing system that includes an imaging device and an image processing device. The method includes capturing images from a plurality of directions by the imaging device, generating frame data of the images captured in the capturing by the imaging device, transmitting the frame data of images captured in the capturing and the projective transformation data to an image processing device by the imaging device, the projective transformation data including photographing direction and projection data, acquiring the projective transformation data and the frame data by the image processing device, generating a transformation table to perform projective transformation on the images, based on the projective transformation data acquired in the acquiring by the image processing device, and transforming the frame data of the images into an omnidirectional image based on the transformation table by the image processing device.

In still another aspect of this disclosure, there is provided an improved non-transitory computer readable storage medium storing a program that causes an image processing device of an omnidirectional video capturing system to perform a method of acquiring projection transformation data transmitted from an imaging device; generating a transformation table for a projective transformation of an image captured by the imaging device, based on the projective transformation data acquired in the acquiring; and transforming frame data of the image into an omnidirectional image based on the transformation table.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIGS. 2A and 2B are block diagrams illustrating a hardware configuration of the omnidirectional video acquisition system according to an embodiment of the present disclosure;

FIGS. 4A through 4C are illustrations of the projective relation in the omnidirectional video capturing system according to an embodiment of the present disclosure;

FIGS. 8A through 8C are illustrations of examples of data columns to be transmitted to an image processing device in the omnidirectional video capturing system according to an embodiment of the present disclosure;

Figure 1:
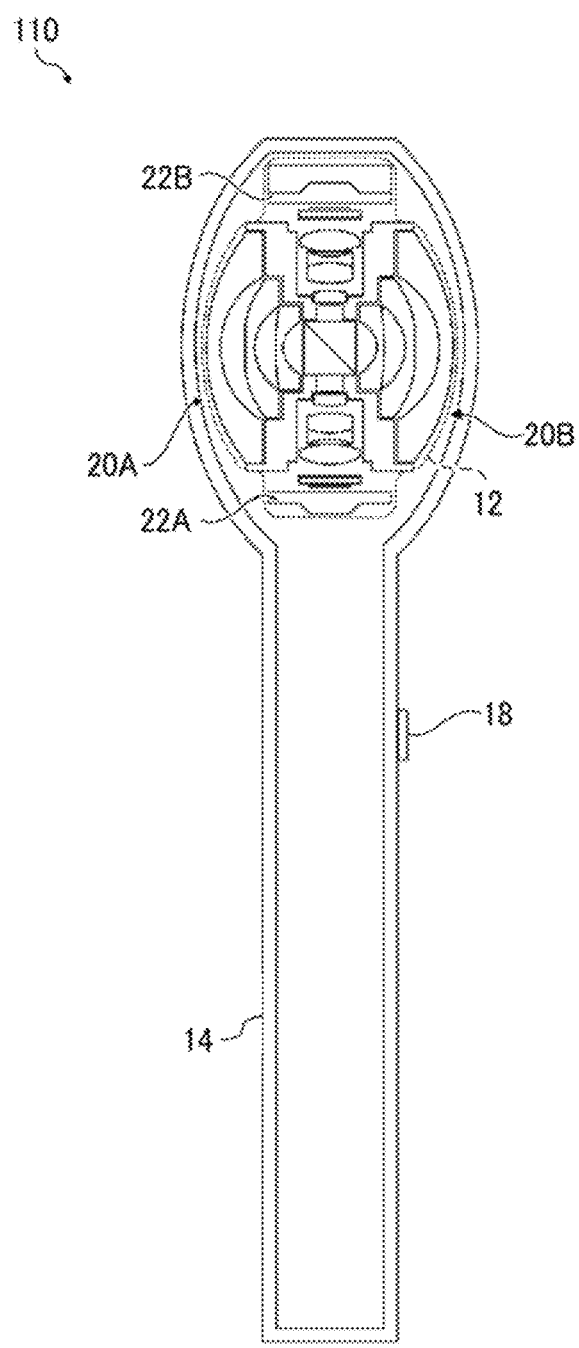
FIG. 1 is a sectional view of an omnidirectional camera of an omnidirectional video acquisition system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that, each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described below, but no limitation is indicated therein. In the following embodiments, an omnidirectional video acquisition system 100 and an omnidirectional camera 110 are described as examples of an imaging device and an imaging system. The omnidirectional camera 110 includes an imaging body 12 that includes two fish-eye lenses. The omnidirectional video acquisition system 100 includes the omnidirectional camera 110 and an imaging processing device 150.

Schematic Configuration

Hereinafter, a description is given of the schematic configuration of the omnidirectional video acquisition system 100 according to the present embodiment with reference to FIG. 1, FIG. 2A, and FIG. 2B. FIG. 1 is a sectional view of the omnidirectional camera 110 of the omnidirectional video acquisition system 100 according to the present embodiment. The omnidirectional camera 110 illustrated in FIG. 1 includes an imaging body 12, a housing 14 that holds the imaging body 12 and components such as a controller and a battery, and a shutter button 18 provided on the housing 14.

The imaging body 12 illustrated in FIG. 1 includes two image-forming optical systems 20A and 20B and two image sensors 22A and 22B. Examples of the image sensors 22A and 22B include charge-coupled devices (COD's) and complementary metal oxide semiconductors (CMOS's). The image-forming optical systems 20A and 20B are hereinafter referred to collectively as an image-forming optical system 20. The image sensors 22A and 22B are hereinafter referred to collectively as an image sensor 22. Each of the image forming optical systems 20 is configured as a fish-eye lens consisting of, for example, seven elements in six groups. In the embodiment illustrated in FIG. 1, the above-mentioned fish-eye lens has a full angle of view of greater than 180 degrees (360 degrees/n, where n denotes the number of optical systems and n is 2), preferably has an angle of view of 190 degrees or greater. Such a wide-angle combination of one of the image-forming optical systems 20 and one of the image sensors 22 is referred to as a wide-angle imaging optical system.

The relative positions of the optical elements (lenses, prisms, filters, and aperture stops) of the two image-forming optical systems 20A and 20B are determined with reference to the image sensors 22A and 22B. More specifically, these elements are positioned such that the optical axis of the optical elements of each of the image forming optical systems 20A and 20B is positioned at the central part of the light receiving area a corresponding one of the image sensors 22 orthogonally to the light receiving area, and such that the light receiving area serves as the imaging plane of corresponding one of the fish-eye lenses.

In the embodiment illustrated in FIG. 1, the image-forming optical systems 20A and 20B have the same specifications, and are combined from opposite directions such that the optical axes thereof coincide with each other. The image sensors 22A and 22B convert the light distribution of the received light into image signals, and sequentially output image frames to the image processing unit of the controller. As will be described later in detail, the images captured by the respective image sensors 22A and 22B are transferred to an image processing apparatus and combined so as to generate an image over a solid angle of 4π steradian (hereinafter, such an image is referred to as an "omnidirectional image"). The omnidirectional image is obtained by photographing all the directions viewable from a photographing location. Thus-obtained consecutive frames of the omnidirectional image form an omnidirectional moving image. In the following embodiment, an omnidirectional image and moving image are to be generated. In some embodiments, a so-called panoramic image and panoramic moving image obtained by photographing 360 degrees only in a horizontal plane or an image that is a part of the image obtained by photographing omnidirectionally or 360 degrees in a horizontal plane may also be generated.

FIG. 2A is a block diagram of the hardware configuration of an omnidirectional camera 110 of an omnidirectional video acquisition system 100 according to the present embodiment. The omnidirectional camera 110 includes a central processing unit (CPU) 112 (a first CPU) as a processing unit, a read only memory (ROM) 114, an image processing block 116, a video compressing block 118, a dynamic random access memory (DRAM) 132 that is connected through a DRAM interface 120, and an acceleration sensor 136 that is connected through an external sensor interface 124.

The CPU 112 controls the operations of components of the omnidirectional camera 110. The ROM 114 stores therein a control program described in a code readable by the CPU 112 and various kinds of parameters. The image processing block 116 is connected to a first image sensor 130A and a second image sensor 130B (corresponding to the image sensor 22A and 22B in FIG. 1), and receives image signals of images captured by the image sensors 130A and 130B. The image processing block 116 includes, for example, an image signal processor (ISP), and applies, for example, shading correction, Bayer interpolation, white balance correction, and gamma correction to the image signals received from the image sensors 130A and 130B.

The video compressing block 118 is a codec block for compressing and expanding a video such as that in MPEG-4 AVC/H.264 format. The DRAM 132 provides a storage area for temporarily storing data therein when various types of signal processing and image processing are applied. The acceleration sensor 136 detects acceleration components of three axes, and the detected acceleration components are used for detecting the vertical direction to apply zenith correction to the omnidirectional image.

The omnidirectional camera 110 further includes an external storage interface 122, a universal serial bus (USB) interface 126, and a serial block 128. The external storage interface 122 is connected to an external storage 134. The external storage interface 122 controls reading and writing to an external storage 134, such as a memory card inserted in a memory card slot. The USB interface 126 is connected to a USB connector 138. The USB interface 126 controls USB communication with an external device such as a personal computer (PC) connected via the USB connector 138. The serial block 128 controls serial communication with an external device such as a PC, and is connected to a wireless network interface card (NIC) 140.

When the power is turned on by the operation of a power switch, the control program mentioned above is loaded into the main memory. The CPU 112 follows the program read into the main memory to control the operations of the parts of the device, and temporarily stores the data required for the control in the memory. This operation implements functional units and processes of the omnidirectional camera 110, as will be described later.

FIG. 2B is a sectional view of a hardware configuration of the image processing device 150 of the omnidirectional video acquisition system 100 according to the present embodiment. The image processing device 150 illustrated in FIG. 2B includes a CPU 152 (a second CPU), a random access memory (RAM) 154, and a hard disk drive (HDD) 156, a graphics processing, unit (GPU) 158, an input device 160 such as a mouse and a keyboard, an external storage 162, a display 164 and keyboard 164, a network interface card (NIC) 166, and a USB connector 166.

The CPU 152 controls the operations of components of the image processing device 150. The RAM 154 provides the work area of the CPU 152. The HDD 156 stores therein an operating system and a control program, such as an application, that executes processes in the imaging processing device 150 according to the present embodiment, each of the operating system and the control program being written in a code decodable by the CPU 152. The GPU 158 is a processor for an image processing, computation to perform various types of image processing operations. Note that the image processing device 150 may not include the GPU 158 and allow the CPU 153 to serve as the GPU 158.

The input devices 160 are input devices, such as a mouse, a keyboard, a touchpad, and a touchscreen, and provide a user interface. The external storage 162 is a removable recording medium mounted, for example, in a memory card slot, and records various types of data, such as image data in a video format and still image data. The display 164 allows an omnidirectional moving image reproduced in response to a user's operation to be displayed on a screen. The wireless network interface card (NIC) 166 provides a radio communication connection to an external device such as the omnidirectional camera 110. The USB connector 16 provides a USB connection to an external device such as the omnidirectional camera 110.

When power is supplied to the image processing device 150 and the power thereof is turned on, the control program is read from a ROM or the HDD 156, and loaded into the RAM 154. The CPU 152 follows the control program read into the RAM 154 to control the operations of the parts of the device, and temporarily stores the data required for the control in the memory. This operation implements functional units and processes of the image processing device 150, as will be described later.

Omnidirectional Moving Image Distribution Function

Figure 3:
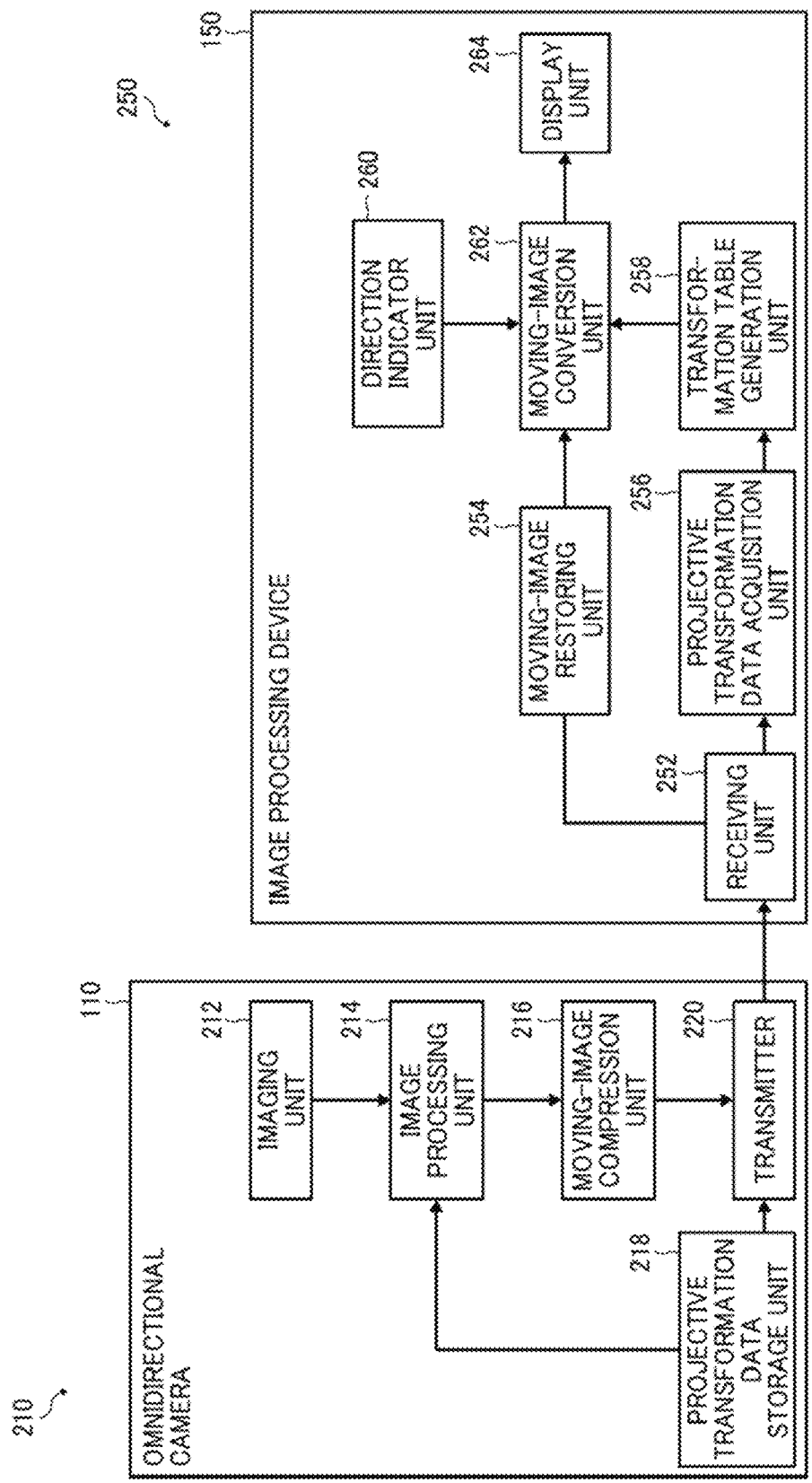
FIG. 3 is a functional block diagram of functions for transmitting omnidirectional moving images in an omnidirectional video capturing system according to an embodiment of the present disclosure.

Hereinafter, a description is given of the omnidirectional moving-image distribution function of the omnidirectional video acquisition system 100 according to the present embodiment, with reference to FIGS. 3 through 12. FIG. 3 is a diagram illustrating a functional block 210 of the omnidirectional moving-image distribution function implemented by the omnidirectional video acquisition system 100 according to the present embodiment.

As illustrated in the left of FIG. 3, the functional block 210 of the omnidirectional camera 110 includes an imaging unit 212 as an imager, an image processing unit 214, a moving-image compression unit 216, a projective transformation data storage unit 218 as a memory, and a transmitter 220. As illustrated in the right of FIG. 3, the functional block 250 of the image processing device 150 includes a receiving unit 252, a moving-image restoring unit 254, a projective transformation data acquisition unit 256, a transformation table generation unit 258 a direction indicator 260, a moving-image conversion unit 262 and a display unit 264.

A description is first given of the functional block 210 of the omnidirectional camera 110. The imaging unit 212, which includes the above-described two wide-angle imaging optical systems, controls the first image sensor 130A and the second image sensor 130B to capture continuous image frames in sequence. Each of the images captured by the image sensors 130A and 130B is a fish-eye image that roughly covers a hemisphere of the whole sphere as a field of view, configuring a partial-view image of the omnidirectional image. Hereinafter, each one of the images captured by the image sensors 130A and 130B may be referred to as a partial-view image.

The image processing unit 214 includes the image processing block 116 to apply, for example, shading correction, Bayer interpolation, white balance correction, and gamma correction to the fish-eye image captured by the imaging unit 212. The image processing unit 214 is capable of embedding projective transformation data into the fish-eye image captured by the imaging unit 212. A detailed description is given later of the embedding of the projective transformation data.

The moving-image compression unit 216 includes the moving-image compression block 118 to compress the continuous image frames captured by the imaging unit 212 into image data in a prescribed moving-image format. The moving-image compressed format includes, but is not limited to, various types of formats such as H.264/Moving Picture Experts Group (MPEG)-4 advanced video coding (AVC), H.265/High Efficiency Video Coding (HEVC), Motion Joint Photographic Experts Group (JPEG), and Motion JPEG 2000.

The Motion JPEG format represents a moving image as continuous still images, and adopting the Motion JPEG format allows obtaining high-quality moving images. In contrast, H.264/MPEG-4 AVC and H.265/High HEVC allow the compression along the time axis, which enhances processing efficiency and reduces factors for a delay in wiring to the external storage 134. The omnidirectional camera 110 for portable use has difficulties in including a high-performance hardware due to the reduction in size and cost. Preferably, the image data is compressed in the direction of time axis. Accordingly, H.264/MPEG-4 AVC and H.265/High HEVC, which are capable of controlling bit rate, are preferably adopted as the moving-image compressed format.

In the embodiment to be described below, the imaging unit 212 separately outputs two fish-eye images simultaneously captured by the image sensors 130A and 130B, respectively to the image processing unit 214. The moving-image compression unit 216 separately generates two pieces of image data in the moving-image formats from the two fish-eye image frames. However, the expression form of the image data is not limited to herein. According to another embodiment, the imaging unit 212 joins two fish-eye images captured by the image sensors 130A and 130B to output a single image to the image processing unit 214. The moving-image compression unit 216 compresses an image frame of the single image including the two fish-eye images into image data in the moving-image form.

The projective transformation data storage unit 218 stores information for projective transformation in, for example, the ROM 114, and provides the information (projective transformation data) to the image processing unit 214 and the transmitter 220. The projective transformation data includes photographing direction data, projection data, and various information. The photographing direction data represents a relation of physical arrangement of lenses used in the omnidirectional camera 11. The projection data represents a relation between an image height of a photographed image and an incident angle at which light enters a fish-eye lens. The information includes an orientation of a fish-eye image arranged in an image frame, the central coordinate of the fish-eye image, the effective diameter of the fish-eye image, optical properties of a lens, and error in assembly of the lens.

The transmitter 220 transmits, as a packet, a collection of the image data and the projective transformation data to the image processing device 150. In some embodiments, each set of the image data associated with the projective transformation data may be individually transmitted to the image processing device 150, instead of collectively transmitting the data as described above. As described above, the image data in combination with the projective transformation data is sent to the image processing device 150 so that the image processing device 150 can join the image data with the projective transformation data in real time, thus providing a comfortable viewing environment for a user.

Next, a description is given of the functional block 250 of the image processing device 150. The receiving unit 252 receives the packet distributed by the omnidirectional camera 110, and sends the received data to the moving-image restoring unit 254 and the projective transformation data acquisition unit 256. The moving-image restoring unit 254 decodes the image data included in the received data using a prescribed codec corresponding to the compressed image data. The moving-image restoring unit 254 restores still-image frames that configure the moving image, sending the frames to the moving-image conversion unit 262.

The projective transformation data acquisition unit 256 extracts the projective transformation data included in the received data, and outputs the projection data and the photographing direction data to the transformation table generation unit 258. The transformation table generation unit 258 generates a table for transforming the image data into an omnidirectional moving image based on the projection data and the photographing direction data. The transformation table generator 258 outputs the transformation table generated thereby to the moving-image conversion unit 262.

The direction indicator 260 designates the viewpoint direction of an omnidirectional image to be displayed, in response to an operation of a user. The viewpoint direction may be designated as any direction desired by a user. The direction indicator 260 outputs the designated viewpoint direction to the moving-image conversion unit 262.

The moving-image conversion unit 262 converts the image data into an omnidirectional moving image based on the transformation table and the viewpoint direction. More specifically, the moving-image conversion unit 262 cuts out the image data according to the viewing direction that indicates an area to be viewed within the omnidirectional image, based on the transformation table in the conversion process. Subsequently, the moving-image conversion unit 262 outputs the image data to the display unit 264.

The display unit 264 includes a display 164 to display the converted image thereon, which provides a moving image to a user. To allow the user to view the moving image, the images corresponding to a specific field of view within the entire 360 space is reproduced and displayed on the display 164 based on the generated moving image using the display application. Note that the user can indicate the viewing direction during the reproduction of the moving images. This allows the user to view the moving images, of which the viewing direction has been changed, in real time.

Note that, the software blocks illustrated in FIGS. 2A and 2B according to the above-described embodiment correspond to functional units implemented by the CPU causing a non-transitory recording medium storing a program according to the present embodiment to implement each hardware unit. The functional units according to the present embodiment may be all implemented by software. Alternatively, some or all of the functional units may be implemented as hardware that has functions equivalent to those of the functional units.

Next, a description is given of projection data included in the projective transformation data. The projection data is parameters used for converting fish-eye images into omnidirectional images. In the projection data, the angles (angle of incidence or incident angles) at which light rays enter a fish-eye lens are associated with the image heights.

Figure 4A:
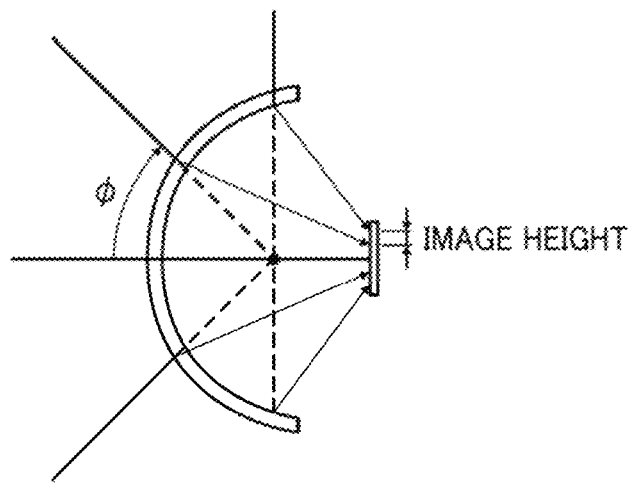
Figure 4B:
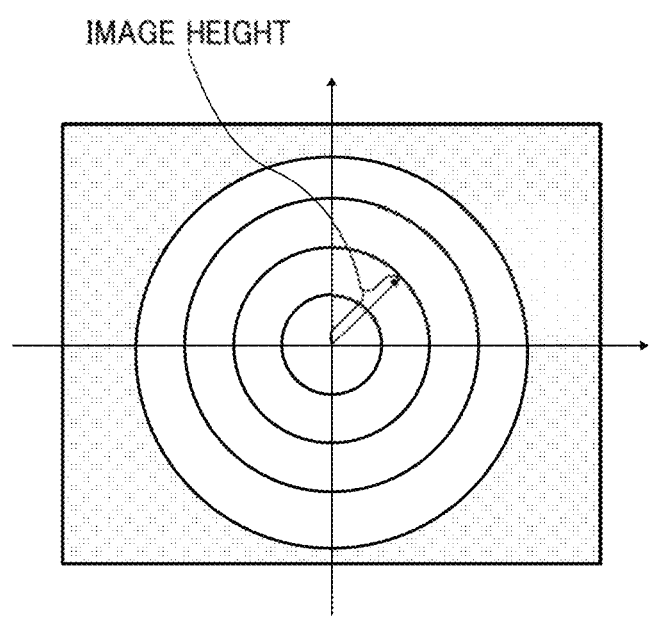

FIGS. 4A, 4B, and 4C are illustrations of a projective relation in the omnidirectional camera 110 using a fish-eye lens. In the present embodiment, an image captured by one fish-eye lens is an image obtained by capturing an orientation range of substantially a hemisphere with reference to a photographing location. As illustrated in FIG. 4A, the fish-eye lens generates an image having an image height h that corresponds to an angle of incidence φ relative to the optical axis. The relation between the image height h and the angle of incidence φ is determined by a projection function according to a prescribed projection model. The projection function varies according to the properties of the fish-eye lens. The fish-eye lens that adopts the equidistance projection as the projection model is expressed by formula (1) where f is focal length:

$$h = f * \varphi \qquad \text{[Formula (1)]}$$

The projection model may be any of the central projection ($h = f*\tan \varphi$), the stereographic projection ($h = 2f*\tan(\varphi/2)$), the equi-solid-angle projection ($h = 2f*\tan(\varphi/2)$), and the orthogonal projection ($h = f*\sin \varphi$). In any of the projections, the image height h of a formed image is determined according to the incident angle φ and the focal length f with reference to the optical axis. In the present embodiment, the configuration of a so-called circular fish-eye lens that has an image circle diameter shorter than a diagonal line of the image is adopted. As illustrated in FIG. 4B the partial-view image obtained from the lens is a planar image including the entire image circle obtained by projecting the captured range of substantially a hemisphere.

FIG. 4C is a table representing an example of a corresponding relation of the projection data in which the incident angles and the image heights are associated with each other as described above. Specifically, the table includes various data, such as the coordinate of the center position of each image-forming optical system, the incident angle, and the image height. The fish-eye image is converted into projective information and displayed as an omnidirectional image.

Figure 5B:
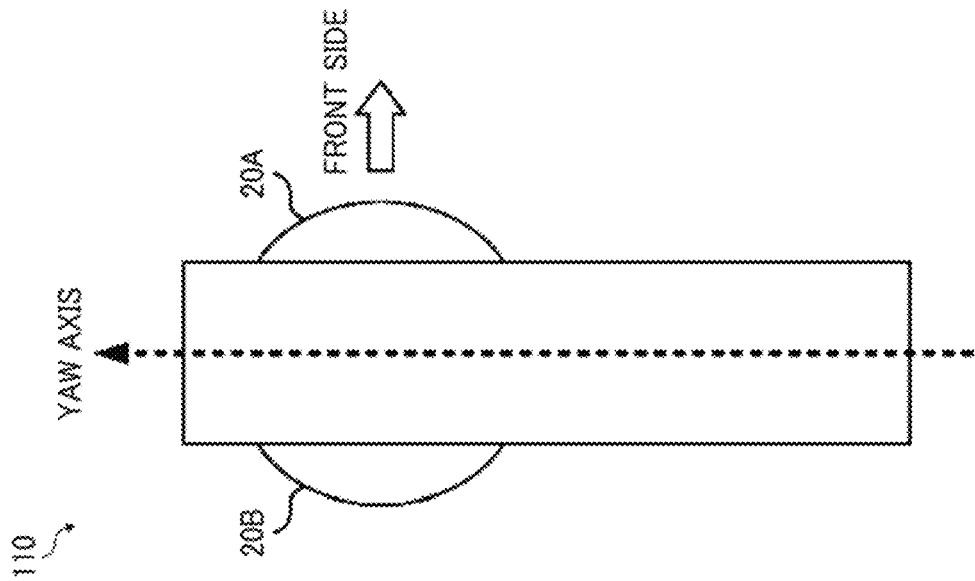
FIGS. 5A and 5B are illustrations of photographing directions of an omnidirectional camera according to an embodiment of the present disclosure.
Figure 5A:
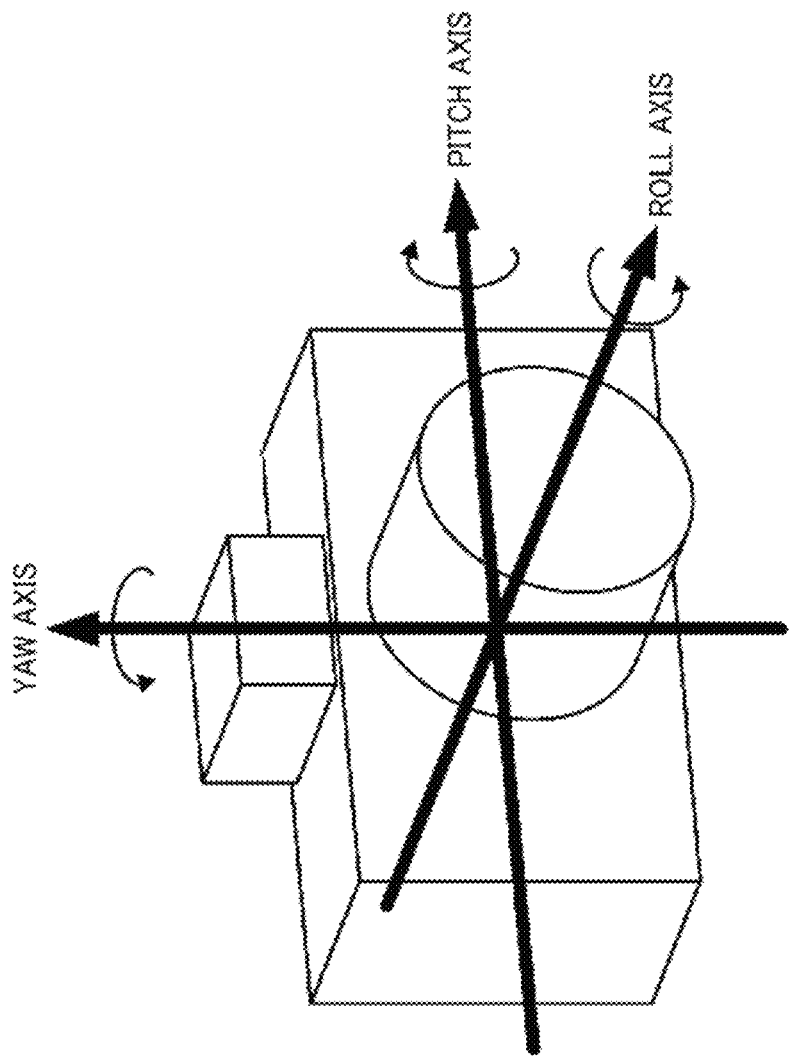

Next, a description is given of the direction that the omnidirectional camera 110 as an imaging device faces for photographing. FIG. 5B is an illustration of a photographing direction of the omnidirectional camera 110 according to the present embodiment. FIG. 5A is an illustration of a typical camera representative of the imaging device, with reference to which three axis directions are defined. In the present embodiment, the front direction of the typical camera, i.e., the optical axis direction of a lens is designated as a Roll axis. The vertical direction of the typical camera is designated as a Yaw axis, and the lateral direction thereof is designated as a Pitch axis. The direction that the omnidirectional camera 110 faces is represented by the rotational angles around the Yaw axis, the Pitch axis, and the Roll axis (which are sometimes referred to simply as Yaw, Pitch, and Roll) with reference to the reference direction (the front direction of the imaging device).

When the omnidirectional camera 110 faces the front direction as illustrated in FIG. 5B for example, the image-forming optical system 20A faces the front direction that is the reference direction. In this case, the rotational angles around the Yaw axis, the Pitch axis, and the Roll axis are 0°, 0°, and 0°, respectively, which is represented by "(Yaw, Pitch, and Roll)=(0, 0, 0)". On the other hand, the image-forming optical system 20B faces the opposite direction to the front direction. In this case, the rotational angles around the Yaw axis, the Pitch axis, and the Roll axis are 180°, 0°, and 0°, respectively, which is represented by "(Yaw, Pitch, and Roll)=(180, 0, 0)".

The omnidirectional camera 110 acquires such data as the photographing direction data for each of the image-forming optical systems 20A and 20B, which allows determining the relative positions of the image-forming optical systems 20A and 20B. The omnidirectional camera 110 transmits the photographing direction data with the image data to the image processing device 150. The image processing device 150 having received the data converts a fish-eye image into an omnidirectional image. Note that FIG. 5B represents a case in which two image-forming optical systems are used. However, the number of the image-forming optical system is not limited to this case. In the present disclosure, the omnidirectional video acquisition system 100 acquires the photographing direction data for each image-forming optical system, to generate an omnidirectional image. Note also that, in the above-described embodiment, the photographing direction of each image-forming optical system is represented with reference to one direction of the omnidirectional camera 110. However, the present disclosure is not limited to this case. In some embodiments, the photographing direction of each image-forming optical system may be relatively represented with reference to the photographing direction of one image-forming optical system. Next, a description is provided of a process for converting a fish-eye image into an omnidirectional image.

Figure 6A:
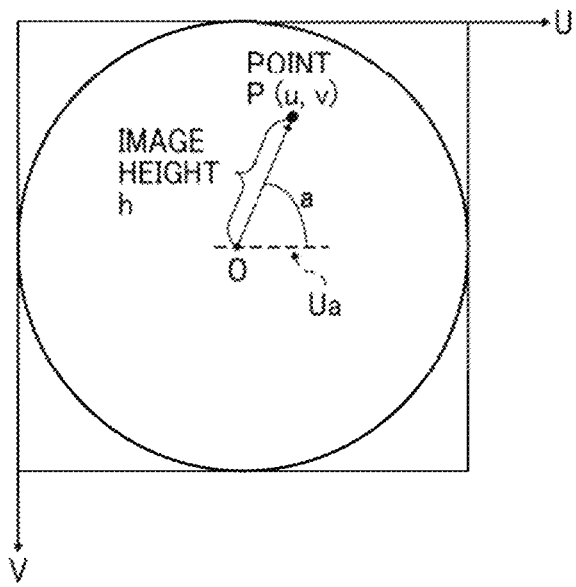
FIGS. 6A and 6B are illustration of texture mapping in which fish-eye images captured by the omnidirectional camera are applied to a three-dimensional sphere.
Figure 6B:
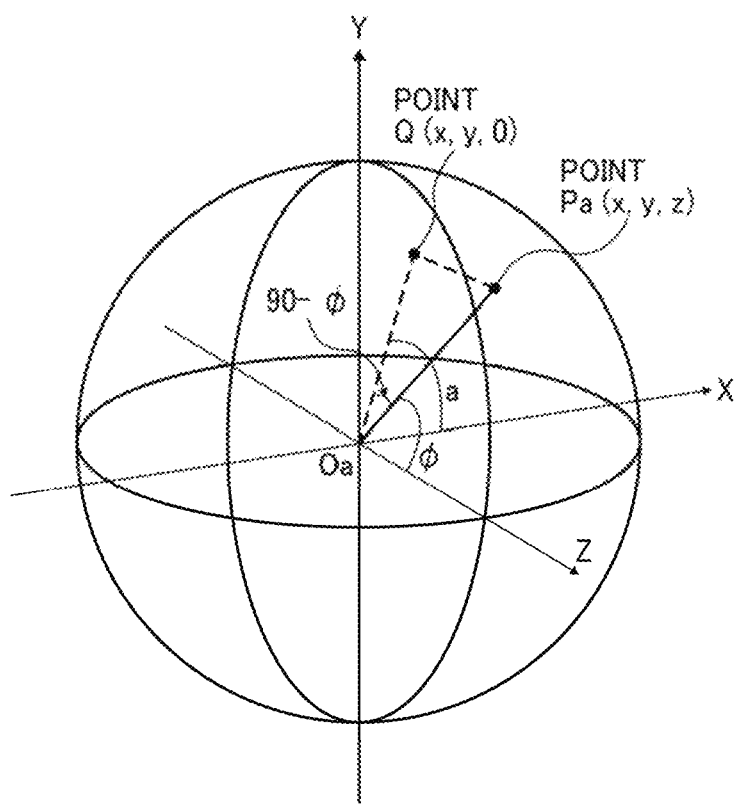

FIG. 6A is an illustration of a fish-eye image as a texture image captured by the omnidirectional camera 110. FIG. 6B is an illustration of a unit sphere having coordinates corresponding to those in the fish-eye image, i.e., the omnidirectional image. That is, texture mapping is performed by applying the fish-eye image of FIG. 6A to a three-dimensional sphere of FIG. 6B. The fish-eye image in FIG. 6A corresponds to the image circle in FIG. 4B. The fish-eye image in FIG. 6A includes a point P of the coordinate (u, v). As illustrated in FIG. 6A, the angle a is formed by the OP line and the dashed line Ua, which is parallel with the U-axis and passes through the center O. The length of the OP line refers to the image height h. The incident angle $\varphi$ for the point P is obtained from the corresponding image height h using any technique, such as the linear correction, based on the projection data of the table in FIG. 4C. With the angles a and $\varphi$, the point P (u, v) is converted into another point Pa (x, y, z) on the three-dimensional sphere.

In FIG. 6B, a point Q (x, y, 0) is obtained by projecting the point Pa onto the XY plane. The angle a in FIG. 6A is formed by the OaQ line and the X-axis where Oa is the center or the sphere. The incident angle $\varphi$ is formed by the OaPa line and the Z-axis. Since the Z-axis is perpendicular to the XY plane, the angle QOaPa that is formed by the OaPa line and the XY plane is 90−$\varphi$. The coordinate (x, y, z) of the point Pa is obtained by formula 2 below:

[Formula 2]

$$x = \sin(90-\varphi) \times \cos \alpha \quad (2\text{-}1)$$

$$y = \sin(90-\varphi) \times \sin \alpha \quad (2\text{-}2)$$

$$z = \cos(90-\varphi) \quad (2\text{-}3)$$

When the point Pa of the coordinate obtained by the above-described formula 2 is rotated in the direction that the imaging device was facing at the time of photographing, by using the photographing direction data, the rotation defined by FIG. 5A is expressed by formula 3 below: Note that the Pitch axis, the Yaw axis, and the Roll axis in FIG. 5A correspond to the X-axis, the Y-axis, and the Z-axis in FIG. 6B, respectively.

[Formula 3]

$$\begin{pmatrix} x' \\ y' \\ z' \end{pmatrix} = \begin{pmatrix} 1 & 0 & 0 \\ 0 & \cos(\text{pitch}) & -\sin(\text{pitch}) \\ 0 & \sin(\text{pitch}) & \cos(\text{pitch}) \end{pmatrix} \begin{pmatrix} x \\ y \\ z \end{pmatrix} \quad (3\text{-}1)$$

$$\begin{pmatrix} x' \\ y' \\ z' \end{pmatrix} = \begin{pmatrix} \cos(\text{yaw}) & 0 & \sin(\text{yaw}) \\ 0 & 1 & 0 \\ -\sin(\text{yaw}) & 0 & \cos(\text{yaw}) \end{pmatrix} \begin{pmatrix} x \\ y \\ z \end{pmatrix} \quad (3\text{-}2)$$

$$\begin{pmatrix} x' \\ y' \\ z' \end{pmatrix} = \begin{pmatrix} \cos(\text{roll}) & -\sin(\text{roll}) & 0 \\ \sin(\text{roll}) & \cos(\text{roll}) & 0 \\ 0 & 0 & 1 \end{pmatrix} \begin{pmatrix} x \\ y \\ z \end{pmatrix} \quad (3\text{-}3)$$

Further, the image processing device 150 performs the perspective projective transformation on a fish-eye image according to the photographing direction using formula 4 below that is obtained from the above-described formula 3.

[Formula 4]

-continued $$\begin{pmatrix} x' \\ y' \\ z' \end{pmatrix} = \begin{pmatrix} \cos(\text{roll}) & -\sin(\text{roll}) & 0 \\ \sin(\text{roll}) & \cos(\text{roll}) & 0 \\ 0 & 0 & 1 \end{pmatrix} \quad (4)$$

$$\begin{pmatrix} 1 & 0 & 0 \\ 0 & \cos(\text{pitch}) & -\sin(\text{pitch}) \\ 0 & \sin(\text{pitch}) & \cos(\text{pitch}) \end{pmatrix} \begin{pmatrix} \cos(\text{yaw}) & 0 & \sin(\text{yaw}) \\ 0 & 1 & 0 \\ -\sin(\text{yaw}) & 0 & \cos(\text{yaw}) \end{pmatrix} \begin{pmatrix} x \\ y \\ z \end{pmatrix}$$

Figure 7A:
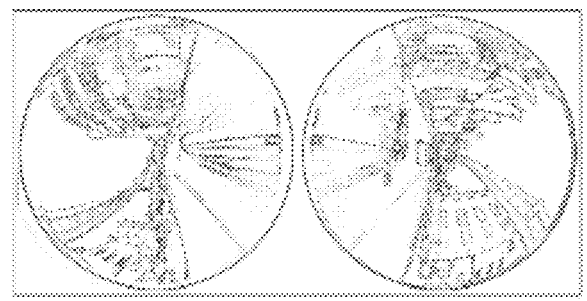
FIGS. 7A through 7C are illustrations of an example of perspective projective transformation of fish-eye images to generate an omnidirectional image viewed from any desired viewing direction.
Figure 7B:
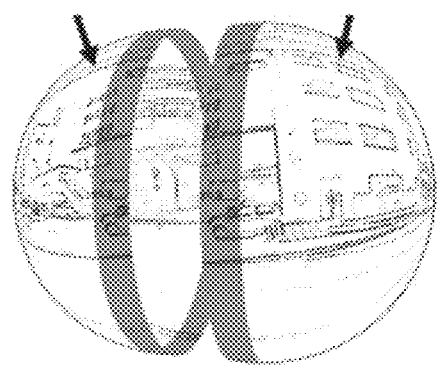
Figure 7C:
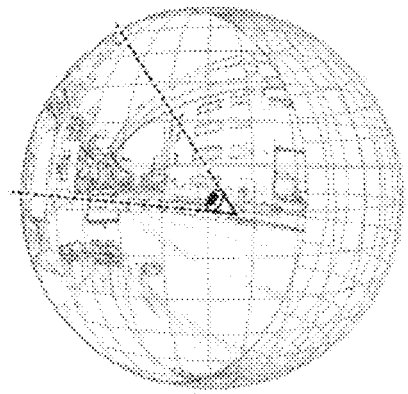

FIGS. 7A, 7B, and 7C are illustrations of an example of the perspective projective transformation using fish-eye images in FIG. 7A. In the perspective projective transformation illustrated in. FIGS. 7A, 7B, and 7C, the images captured by two fish-eye lenses are subjected to the perspective projective transformation in any desired direction. FIG. 7A is an illustration of the captured fish-eye images. The fish-eye images in FIG. 7A are applied to the three-dimensional sphere of FIG. 6B by using the coordinates of the fish-eye images in FIG. 7A that respectively correspond to the coordinates on the three-dimensional sphere in FIG. 6B. Thus, hemispherical images are generated as illustrated in FIG. 7B. That is, as is apparent from FIGS. 7A and 7B, two fish-eye images are applied for the projective transformation, and thus two hemispherical images are obtained. Note that the deep-colored areas in FIG. 7B refer to areas of the respective hemisphere to overlap with each other. In the omnidirectional image converted from the hemisphere images, the transmittance is set in a phased manner, thereby to obscure the joining part between the hemisphere images, thus providing a less unnatural image.

The hemispherical images of FIG. 7B are joined, thereby generating an omnidirectional image. As illustrated in FIG. 7C, a perspective projection camera is virtually disposed in the center of the sphere covered with the images. A user can view the omnidirectional image by cutting out an image front any desired direction or at any desired angle of view from the perspective projection camera. Note that the process in FIGS. 7A through 7C is performed in real time by using a graphics processing unit (GPU) 158 mounted on the image processing device 150.

According to the above-described formulas 1 through 4, a table for transforming a fish-eye image into a three-dimensional sphere is generated. The image processing device 150 displays the transformed three-dimensional sphere such that the transformed three-dimensional sphere is viewed from the virtual perspective projection camera, thus providing an image viewed from any desired viewing direction as illustrated in FIG. 7C. To perform such a transformation process, the omnidirectional camera 110 transmits the image data together with the projective transformation data, such as the photographing direction data and the projection data, as additional information, to the image processing device 150.

In the above-described process for the projective transformation, the image data is associated with the projective transformation data in a data transmission. The method of data transmission may be any one of the various methods as represented in FIGS. 8A-C. FIGS. 8A-C are illustrations of examples of a data column to be transmitted in the omnidirectional video acquisition system 100 according to the present embodiment FIG. 8A is an illustration of a data transmitting method in which the projective transformation data is embedded in an optional area for an image frame header in the data column. FIG. 8B is an illustration of another data transmitting method in which the projective transformation data is associated with each frame data. FIG. 8C is an illustration of still another data transmitting method in which the projective transformation data is embedded as the image data in frame data. The following describes a detailed description of each data transmitting method.

Initially, a description is given of die data transmitting method in FIG. 8A. The data column to be transmitted consists of a real-time transport protocol (RTP) header, an image frame header, an optical area for image frame header, and frame data. By transmitting to the image processing device 150 the data in which the projective transformation header is embedded in the optional area of image frame data, the image processing device 150 acquires the photographing direction data and the projection data, thus performing the projective transformation.

Figure 9:
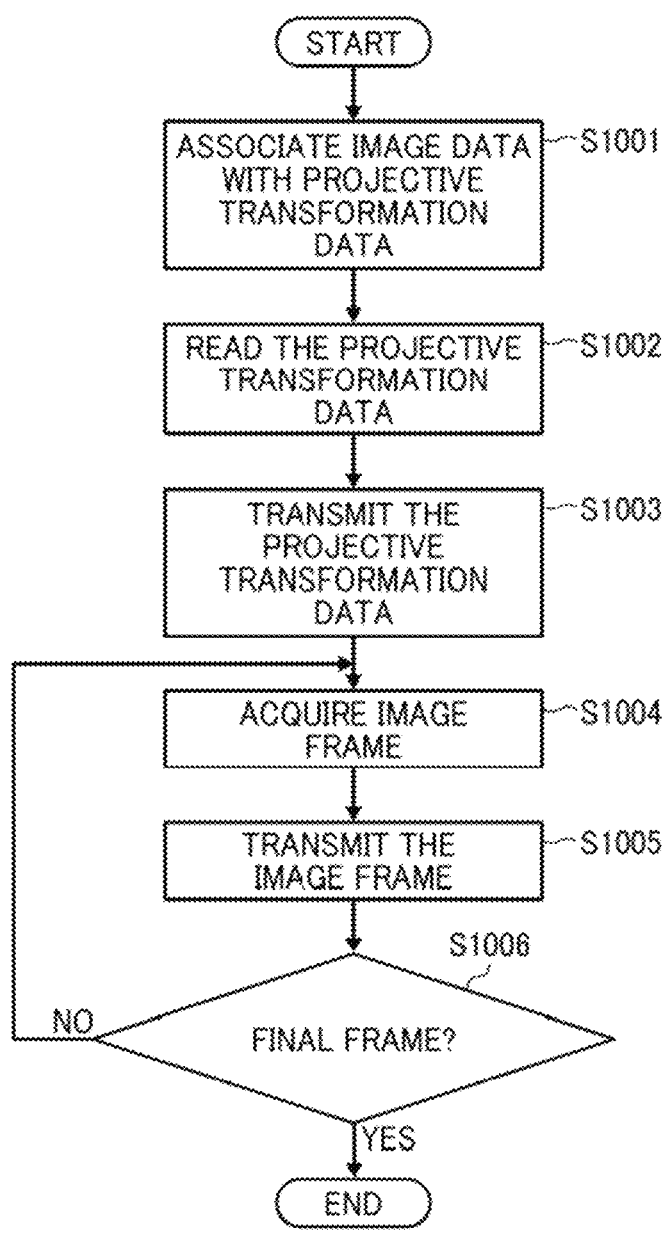
FIG. 9 is a flowchart of a process for transmitting image data with the projective transformation data to the image processing device in the omnidirectional video imaging system according to an embodiment of the present disclosure.

Next, a description is given of the data transmitting method of FIG. 8B. In the method in FIG. 8B, the projective transformation data is associated with each frame data in a data transmission. The data column of the image data is transmitted separately from the data column of the image data. The data column of the image data is configured to include the RTP header, the image frame header, and the frame data. The data column of the projective transformation data is configured to include the projective transformation data associated with each frame data in the image data. The following describes the process for transmitting the data column in FIG. 8B, referring to FIG. 9. FIG. 9 is a flowchart of the processing for transmitting the image data with the projective transformation data in the omnidirectional video acquisition system 100 according to the present embodiment.

The photographing is performed before the processing starts. When the processing starts, the image data, the data regarding photographing direction at the time of photographing, and the projective transformation data are stored in the DRAM 132. Next, the omnidirectional camera 110 associates the image data with the projective transformation data which are stored in the DRAM 132 in step S1001. The process in the step S1001 is performed using data regarding the time of storage.

Subsequently, the transmitter 220 reads out the projective transformation data from the projective transformation data storage unit 218 in step S1002, and subsequently transmits the projective transformation data to the image processing device 150 in step S1003.

The transmitter 220 further reads out frame data (extract an image frame) of a moving image processed by the moving-image compression unit 216 in step S1004, and transmits the image frame to the image processing device 150 in step S1005. Subsequently, the transmitter 220 determines whether the image frame transmitted is the last frame in step S1006. When the transmitter 220 makes an affirmative determination, the processing ends. When the transmitter 220 makes a negative determination in step S1006, the operation returns to step S1004 to repeat the process for acquiring an image frame and the process for transmitting the image frame until the last frame is treated.

The above-described processing in FIG. 9 allows the image processing device 150 to acquire the image data and the projective transformation data, thereby generating the transformation table based on the acquired projective transformation data. Such a transformation table allows displaying an omnidirectional image viewed from any desired viewing direction in real time.

Figure 10:
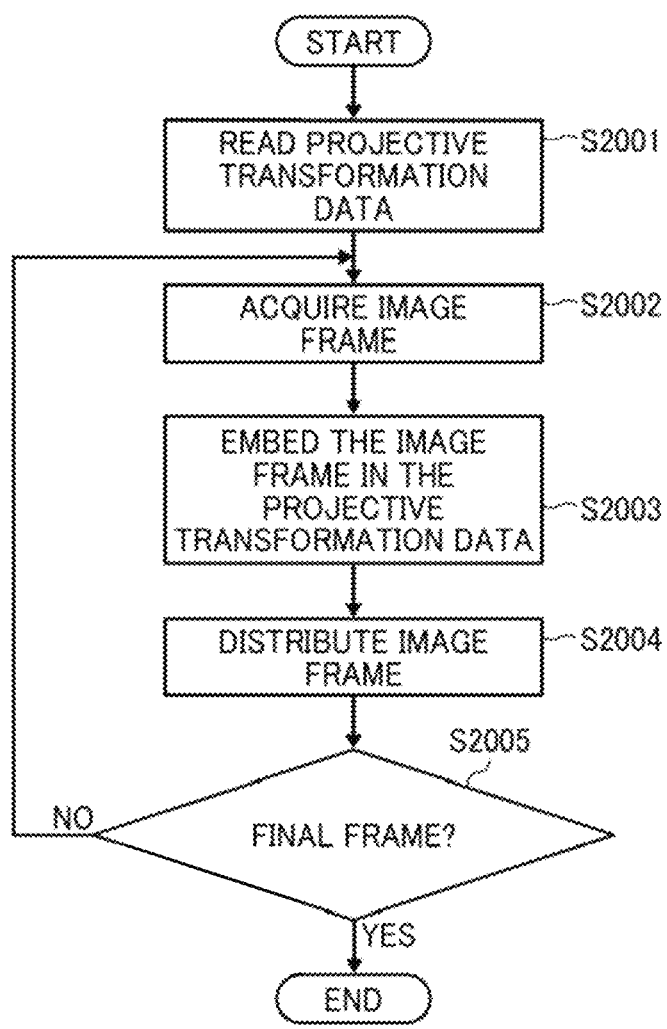
FIG. 10 is a flowchart of another process for transmitting the image data with the projective transformation data to the image processing device in the omnidirectional video capturing system according to another embodiment of the present disclosure.

Lastly, a description is given of the data transmitting method in FIG. 8C. In the method in FIG. 8C, the projective transformation data is embedded as image data in frame data in data transmission. The following describes the process for transmitting the data column in FIG. 8C, referring to FIG. 10. FIG. 10 is a flowchart of the processing for transmitting the image data with the projective transformation data in the omnidirectional video acquisition system 100 according to the present embodiment. In the processing of the FIG. 10, a description of the same processes as those of FIG. 9 is omitted as appropriate.

Subsequently, the image processing unit 214 reads out the projective transformation data in step S2001. The image processing unit 214 acquires the captured image frame in step S2002.

The image processing unit 214 embeds the projective transformation data readout in the step S2001 into the image frame in step S2003. The method for embedding the projective transformation data includes, for example, 1) embedding the projective transformation data into a frame as image data and 2) embedding the projective transformation data into frequency space obtained by applying discrete cosine transformation (DCT) to the image data. The above-described embedding method 1) and 2) are described in detail, referring to FIGS. 11A and 11B and FIGS. 12A through 12C.

Figure 11A:
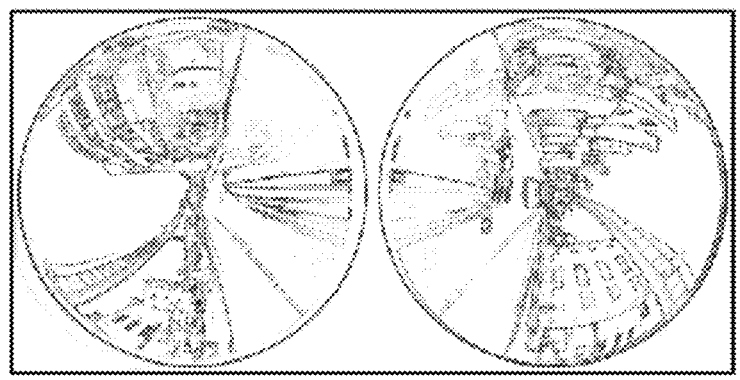
FIGS. 11A and 11B are illustrations of an example in which the projective transformation data is embedded as image data in an image frame.
Figure 11B:
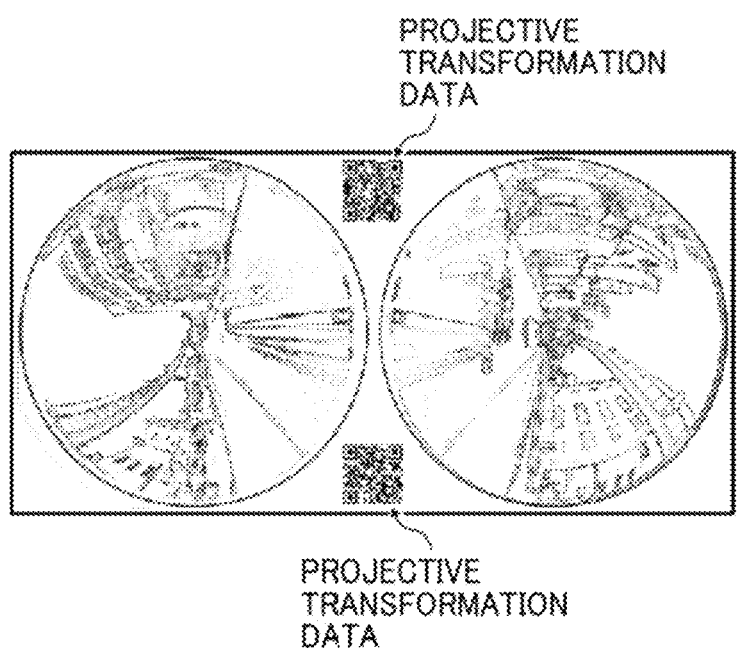

FIGS. 11A and 11B are illustrations of an example of embedding projective transformation data as image data in an image frame. FIG. 11A illustrates the image frame including captured fish-eye images. FIG. 11B illustrates the image frame with the projective transformation data embedded therein. When the fish-eye images, which are circular as illustrated in FIG. 11A, are arranged in a rectangular frame, disused areas, which are not related to the fish-eye images, are provided around the fish-eye images. By embedding the projective transformation data as image data into such a disused area, the projective transformation data can be transmitted to another device, together with the image frame data. Note that, the image data of the projective transformation data is illustrated as a Quick Response (QR) code (registered trademark) in FIG. 11B. However, the present disclosure is not limited to this case.

Figure 12A:
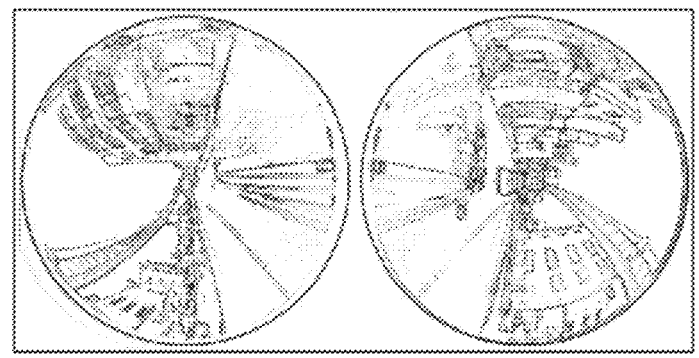
FIGS. 12A through 12C are illustrations of an example in which the projective transformation data is embedded in frequency space.
Figure 12B:
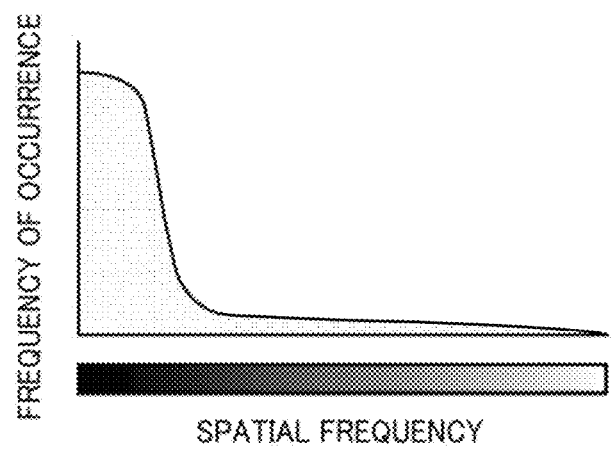
Figure 12C:
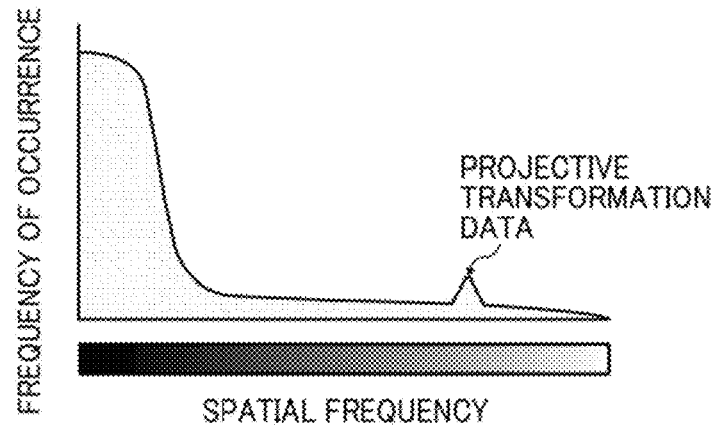

FIGS. 12A through 12C are illustrations of an example in which the projective transformation is embedded in the frequency space. FIG. 12A illustrates an image frame including captured fish-eye images. FIG. 12B is a histogram in which the DCT is applied to the frame. FIG. 12C is a histogram that includes the projective transformation data.

As illustrated in FIG. 12B, the frequency components of the signals applied with the DCT are concentrated on the low-frequency area, so that the intensity of the high-frequency component is very weak. For this reason, data is superimposed on the high-frequency area of the histogram as illustrated in FIG. 12C, which leads to the same condition as that in which the projective transformation data is embedded in the frame data. That is, the image processing unit 214 adds data to the high-frequency, and applies the inverse DCT to the image data, thereby obtaining the same effects as in the case where the projective transformation data is embedded in the frame data of an image. Since the projective transformation data is superimposed on the high-frequency area, the effects on the image data can be minimized. Further, the difference between the original image data and the inverse DCT applied image data can be reduced to a noise level.

Referring back to the step S2003 in FIG. 10, the image processing unit 214 embeds the projective transformation data into the image frame using the embedding methods in FIGS. 11A and 11B, and FIGS. 12A through 12C. Subsequently, the transmitter 220 transmits the image frame to the image processing device 150 in step S2004, and determines whether the image frame transmitted is the last frame in step S2005. When the transmitter 220 makes an affirmative determination, the processing ends. When the transmitter 220 makes a negative determination in step S2005, the operation returns to step S2002 to repeat a set of the processes for acquiring an image frame, embedding the projective transformation data into the image frame, and transmitting the image frame until the last frame is treated.

The process in FIG. 10 allows the image processing device 150 to acquire the image data including the embedded the projective transformation data, thereby generating the transformation data based on the acquired projective transformation data. Such a transformation table allows displaying an omnidirectional image viewed from any desired direction.

The above-described embodiments can provide an imaging device that is capable of transmitting data for transforming image data into an omnidirectional image to the terminal, and the method thereof, and a non-transitory recording medium storing a program therefor.

Each function in the exemplary embodiment may be implemented by a program described in C, C++, C# or Java (registered trademark). The program may be provided using any storage medium that is readable by an apparatus, such as a hard disk drive, compact disc (CD) ROM, magneto-optical disc (MO), digital versatile disc (DVD), a flexible disc, erasable programmable read-only memory (EPROM), or electrically erasable PROM. Alternatively, the program may be transmitted via network such that other apparatus can receive it.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An imaging device communicable with an image processing device, the imaging device comprising:
   an imager including imaging lenses to capture images from a plurality of directions;
   a memory to store projective transformation data, the projective transformation data including photographing direction data, for each of the imaging lenses, representing a relation of a physical arrangement of lenses used in the imaging device and the plurality of directions and projection data representing image heights of the images associated with angles at which light rays enter the imaging lenses; and
   a transmitter to transmit frame data of the images, as a plurality of frames of a moving image, and the projective transformation data read from the memory to the image processing device which transforms the frame data of the images into an omnidirectional image;

wherein there are two imaging lenses included in the imager that are disposed on opposing front and back sides of the imager, the photographing direction data indicates that a first imaging lens of the two imaging lenses is predetermined to face a front direction based on an optical axis direction of the first imaging lens being set to 0° and an optical axis direction of a second imaging lens of the two imaging lenses being set to 180°.

2. The imaging device according to claim 1,
wherein the transmitter transmits the projective transformation data in association with the frame data to the image processing device.

3. The imaging device according to claim 1, further comprising an image processor to embed the projective transformation data as image data in the frame data,
wherein the transmitter transmits the frame data with the projective transformation data embedded to the image processing device.

4. The imaging device according to claim 1, further comprising an image processor to apply discrete cosine transformation (DCT) to the frame data, embed the projective transformation data in a high-frequency area of the frame data applied with the DCT, and apply inverse DCT to the frame data with the projective transformation data embedded,
wherein the transmitter transmits the frame data applied with the inverse DCT to the image processing device.

5. The imaging device according to claim 1, further comprising an image processor to embed the projective transformation data in an optional area of a header included in a data column,
wherein the transmitter transmits the data column to the image processing device.

6. An omnidirectional video capturing system comprising:
the imaging device according to claim 1; and
the image processing device, including circuitry to:
acquire the projective transformation data transmitted from the imaging device;
generate a transformation database for a projective transformation of an image captured by the imaging device, based on the projective transformation data; and
transform the frame data of the image into an omnidirectional image based on the transformation database.

7. A method of imaging comprising:
capturing images from a plurality of directions by an imaging device communicable with an image processing device, the imaging device including an imager including imaging lenses to capture the images from the plurality of directions;
generating frame data of the images captured in the capturing by the imaging device; and
transmitting the frame data of the images captured in the capturing, as a plurality of frames of a moving image, and projective transformation data to the image processing device by the imaging device, the projective transformation data including photographing direction data, for each of the imaging lenses, representing a relation of a physical arrangement of lenses used in the imaging device and the plurality of directions, and projection data, wherein the image processing device transforms the frame data of the images into an omnidirectional image;
wherein there are two imaging lenses included in the imager that are disposed on opposing front and back sides of the imager, the photographing direction data indicates that a first imaging lens of the two imaging lenses is predetermined to face a front direction based on an optical axis direction of the first imaging lens being set to 0° and an optical axis direction of a second imaging lens of the two imaging lenses being set to 180°.

8. The method according to claim 7, further comprising:
acquiring the projective transformation data and the frame data by the image processing device;
generating a transformation database to perform projective transformation on the images, based on the projective transformation data acquired in the acquiring by the image processing device; and
transforming the frame data of the images into the omnidirectional image based on the transformation database by the image processing device.

9. A non-transitory computer readable storage medium storing a program that causes an image processing device of an omnidirectional video capturing system to perform a method of imaging, comprising:
acquiring frame data of images captured by an imaging device, as a plurality of frames of a moving image, and projective transformation data transmitted from the imaging device that capture the images from a plurality of directions, the imaging device including an imager including imaging lenses to capture the images from the plurality of directions, the projective transformation data including photographing direction data, for each of the imaging lenses, representing a relation of a physical arrangement of lenses used in the imaging device and representing the plurality of directions and projection data representing image heights of the images associated with angles at which light rays enter the imaging lenses;
generating a transformation database for a projective transformation of the images captured by the imaging device, based on the projective transformation data acquired in the acquiring; and
transforming the images into an omnidirectional moving image based on the transformation database;
wherein there are two imaging lenses included in the imager that are disposed on opposing front and back sides of the imager, the photographing direction data indicates that a first imaging lens of the two imaging lenses is predetermined to face a front direction based on an optical axis direction of the first imaging lens being set to 0° and an optical axis direction of a second imaging lens of the two imaging lenses being set to 180°.

10. The non-transitory computer readable storage medium according to claim 9, wherein the method of imaging is performed in real time in response to an inputted viewpoint direction of the omni-directional image received from a user.

11. The imaging device according to claim 1, wherein the imager captures images of a first type from the plurality of directions, and the projective transformation data is configured to allow the image processing device to convert the images from the first type into the omni-directional image based on an inputted viewpoint direction of the omni-directional image received from a user.

12. The imaging device according to claim 11, wherein the captured images of the first type are wide-angle images or fish-eye images.

13. The imaging device according to claim 11, wherein the omni-directional image is a moving image that is generated in real time in response to the inputted viewpoint direction of the omni-directional image received from the user.

* * * * *